United States Patent
Inoue et al.

(10) Patent No.: US 6,720,514 B1
(45) Date of Patent: Apr. 13, 2004

(54) PLASTIC SORTER

(75) Inventors: Tetsuya Inoue, Osaka (JP); Hiroyuki Daiku, Osaka (JP); Masanori Tsukahara, Osaka (JP); Hiroaki Arai, Osaka (JP); Hidehiko Maehata, Osaka (JP); Tsuyoshi Kato, Osaka (JP)

(73) Assignee: Hitachi Zosen Corporation (JP)

( * ) Notice: Subject to any disclaimer, the term of this patent is extended or adjusted under 35 U.S.C. 154(b) by 3 days.

(21) Appl. No.: 10/070,984

(22) PCT Filed: Sep. 20, 2000

(86) PCT No.: PCT/JP00/06436
§ 371 (c)(1),
(2), (4) Date: Mar. 13, 2002

(87) PCT Pub. No.: WO01/21318
PCT Pub. Date: Mar. 29, 2001

(30) Foreign Application Priority Data

Sep. 20, 1999 (JP) ............................................. 11-264707
Oct. 28, 1999 (JP) ............................................. 11-306155

(51) Int. Cl.$^7$ .............................. B03C 7/00; B03C 7/04; B03C 7/06
(52) U.S. Cl. ................. 209/128; 209/127.1; 209/127.2; 209/127.3; 209/129; 209/130
(58) Field of Search ............................... 209/128, 127.1, 209/127.2, 127.3, 129, 130, 131, 229

(56) References Cited

U.S. PATENT DOCUMENTS

| 4,882,043 | A | * | 11/1989 | Jung | .......................... 209/212 |
| 5,098,558 | A | * | 3/1992 | Knoll et al. | ............. 209/127.3 |
| 5,251,762 | A | * | 10/1993 | Taylor et al. | ............ 209/127.4 |
| 5,746,320 | A | * | 5/1998 | Fujita et al. | ............. 209/127.3 |
| 5,845,783 | A | * | 12/1998 | Smith | ....................... 209/127.4 |
| 6,359,246 | B1 | * | 3/2002 | Essig et al. | .............. 209/127.1 |

FOREIGN PATENT DOCUMENTS

JP          11-220581       8/1999  ............. B03C/7/06

\* cited by examiner

Primary Examiner—Donald P. Walsh
Assistant Examiner—Jonathan R Miller
(74) Attorney, Agent, or Firm—Mark Kusner; Michael A. Jaffe

(57) ABSTRACT

A feed tray (22) for guiding tribo electrified plastic pieces (2) to a drum electrode (6) is provided with a vibrator (23), thereby making it possible to vibrate the plastic pieces (2) to form a thin uniform layer, and to reliably apply appropriate image force and centrifugal force to the plastic pieces (2) fed to the drum electrode (6); thus, the plastic pieces (2) can be separated according to kind with high precision.

4 Claims, 16 Drawing Sheets

F I G. 1
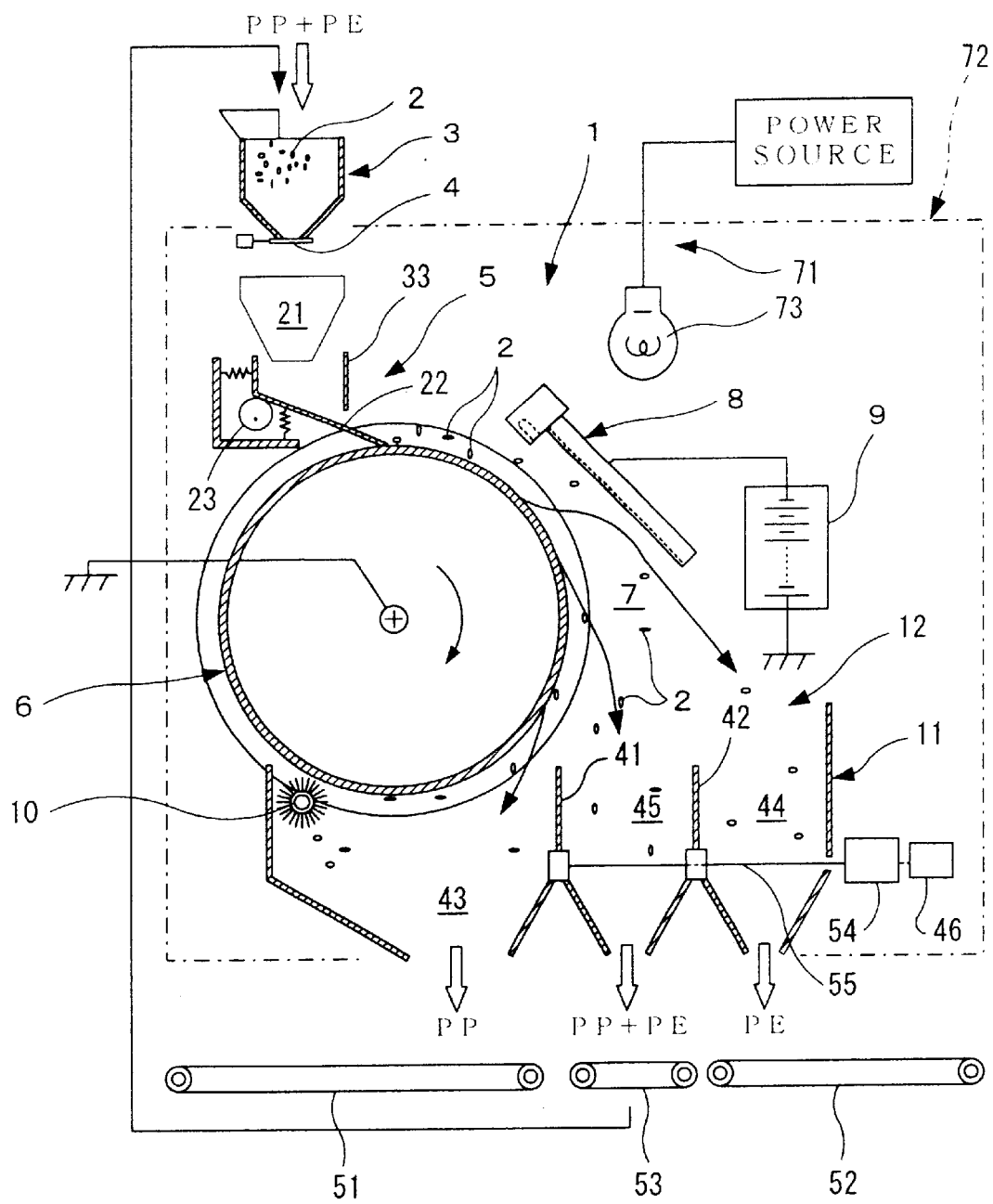

F I G. 4
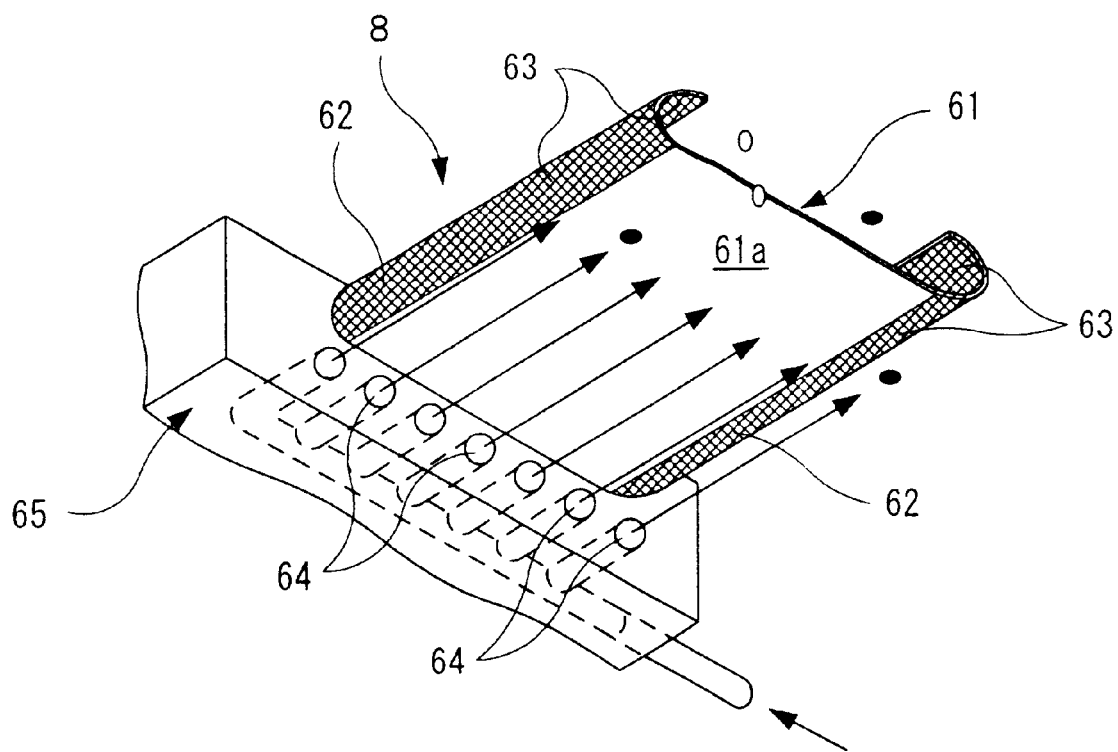

PLASTIC SORTER

TECHNICAL FIELD

The present invention relates to a plastic sorter for sorting and separating plastic pieces collected and crushed for recycling, according to their types.

BACKGROUND ART

One of the well-known techniques of sorting plastic pieces is a static separating plastic sorter 101 such as the one shown in FIG. 19. The plastic sorter 101 is composed of a tribo electrifying apparatus 104 for electrifying a plurality of types of plastic pieces 102 so that the plastic pieces have different polarities and amounts of electrification depending on their types, the tribo electrifying apparatus being arranged below a hopper 103 through which the plastic pieces 102 are introduced, and a static separator 105 arranged below the tribo electrifying apparatus 104 for separating the electrified plastic pieces 102 according to their polarities and amounts of electrification.

The static separator 105 comprises a drum electrode 106 arranged below a chute of the tribo electrifying apparatus 104, an opposite electrode 107 arranged obliquely above the drum electrode 106, and a brush 108 for scraping off the plastic pieces 102 attached to an outer peripheral surface of the drum electrode 106. The drum electrode 106 is constructed so as to be freely rotated around a horizontal shaft in a direction shown by an arrow in the drawing and is grounded. The opposite electrode 107 has, for example, a negative electrode of a high-voltage power source apparatus 109 connected thereto, with a positive electrode of the high-voltage power source apparatus 109 grounded. This connection allows a high voltage to be applied between the opposite electrode 107 and the drum electrode 106 to form a sorting static field 110. To collect the plastic pieces 102 passed through the sorting static field 110, according to their types, a first separating container 112 and a second separating container 113 which are separated from each other by a separator 111 are arranged under the drum electrode 106.

In this plastic sorter 101, the plastic pieces 102 are introduced into the hopper 103 and then fed therefrom to the tribo electrifying apparatus 104, where they are agitated. Then, the plastic pieces 102 are frictionally contacted with one another and thus tribo-electrified so as to have predetermined polarities and amounts of electrification depending on their types and according to their electrification ranks. Then, the plastic pieces 102, fed from the tribo electrifying apparatus 104 onto the drum electrode 106, pass through the sorting static field 110 between the drum electrode 106 and the opposite electrode 107 and have their falling tracks varying according to their polarities and amounts of electrification before being housed in the separate separating containers 112 and 113.

The principle of this static separation will be described with reference to FIG. 20.

When the tribo-electrified plastic pieces 102 are dropped onto the drum electrode 106, rotated in the direction shown by the arrow in the drawing, image force Fm, centrifugal force Fc and gravity G act on these plastic pieces 102. Then, when the drum electrode 106 is rotated to feed the plastic pieces 102 into the static field 110, plastic pieces 114 negatively electrified contrary to the drum electrode 106 are subjected to static force Fs acting in a direction in which the plastic pieces 114 are attracted to the drum electrode 106, whereas plastic pieces 115 positively electrified like the drum electrode 106 are subjected to static force Fs and centrifugal force Fc acting in a direction in which the plastic pieces 115 repel the drum electrode 106. If the sum of the vectors of the image force Fm, centrifugal force Fc, gravity G, and static force Fs acts outward of the drum electrode 106, then the plastic pieces 102 follow such falling tracks that they leave the drum electrode 106 before being collected in the second separating container 113. In contrast, if the sum of the vectors lies on the drum electrode 106, the plastic pieces 102 are attracted to the drum electrode 106 or fall below the drum electrode 106 before being collected in the first separating container 112.

The plastic pieces 102 are separated from one another by setting conditions for the high-voltage power source apparatus 109 such as the voltage at the apparatus 109 and the location of the separator 111 so as to control the above-described forces acting on the plastic pieces 102. Accordingly, one of the conditions for precise separation is the reliable action of the image force Fm and centrifugal force Fc on the plastic pieces 102.

When, however, the plastic pieces 102, which are in the form of a laminated mass by the tribo electrifying apparatus 104, are fed from the chute, they are likely to be laminated on a surface of the drum electrode 106. Consequently, the image force Fm and the centrifugal force Fc do not properly act on the plastic pieces 102, which are thus not precisely separated from one another.

Further, it is contemplated that the static force Fs may be increased to allow the plastic pieces 102 to be more precisely separated from one another. When, however, the voltage applied to the drum electrode 106 and the opposite electrode 107 is increased, corona discharge occurs between the drum electrode 106 and the opposite electrode 108 to generate corona ions, which may affect the electrified state of the plastic pieces 102 to reduce the separation accuracy.

Furthermore, in this static separating plastic sorter 101, if the atmospheric humidity is high at the time when the plastic pieces 102 are electrified or statically separated from one another, the plastic pieces 102 may not be electrified easily or the time for which an electrification potential is retained may decrease, thus making the polarities and amounts of electrification of the plastic pieces 102 unstable. Consequently, the plastic pieces 102 cannot be appropriately separated from one another in the sorting static field 110, thereby making the falling tracks of the plastic pieces 102 unstable to hinder the plastic pieces 102 from being precisely separated from one another.

It is thus an object of the present invention to provide a plastic sorter that can more precisely separate plastic pieces from one another according to their types.

DISCLOSURE OF INVENTION

The present invention provides a plastic sorter comprising a tribo electrifying apparatus for tribo-electrifying a plurality of types of plastic pieces by agitation, a feeder for feeding the plastic pieces electrified by the tribo electrifying apparatus, a static separating section for statically separating and sorting the plastic pieces fed by the feeder, according to their polarities and amounts of electrification, and a collecting section for collecting therein the plastic pieces passed through the static separating section and separated from one another, the static separating section being provided with a drum electrode that can be freely rotated around a horizontal shaft and an opposite electrode arranged opposite the drum electrode via a space used as a sorting static field, wherein the feeder is provided with a feed tray for guiding the electrified plastic pieces onto the drum electrode and a vibrator for vibrating the feed tray.

With this construction, the feed tray for guiding the electrified plastic pieces to the drum electrode is provided with the vibrator, thereby making it possible to vibrate the plastic pieces being moved on the feed tray to disentangle the massive plastic pieces to form a thin uniform layer. Accordingly, a large number of plastic pieces form a thin uniform layer on the drum electrode so as not to be laminated, so that the plastic pieces can be reliably subjected to appropriate image force and centrifugal force. Thus, appropriate force can be applied to the plastic pieces in a sorting static field, thereby allowing the plastic pieces to be precisely separated from one another according to their types. Further, the falling tracks of the plastic pieces do not substantially vary, thus eliminating the need to adjust the position of the separator or the like in the collecting section to enable efficient collection.

BRIEF DESCRIPTION OF DRAWINGS

FIG. 1 is a view showing an entire configuration of an embodiment of a plastic sorter according to the present invention;

FIG. 4 is a perspective view showing the opposite electrode of the plastic sorter as viewed from below;

BEST MODE FOR CARRYING OUT THE INVENTION

Figure 2:
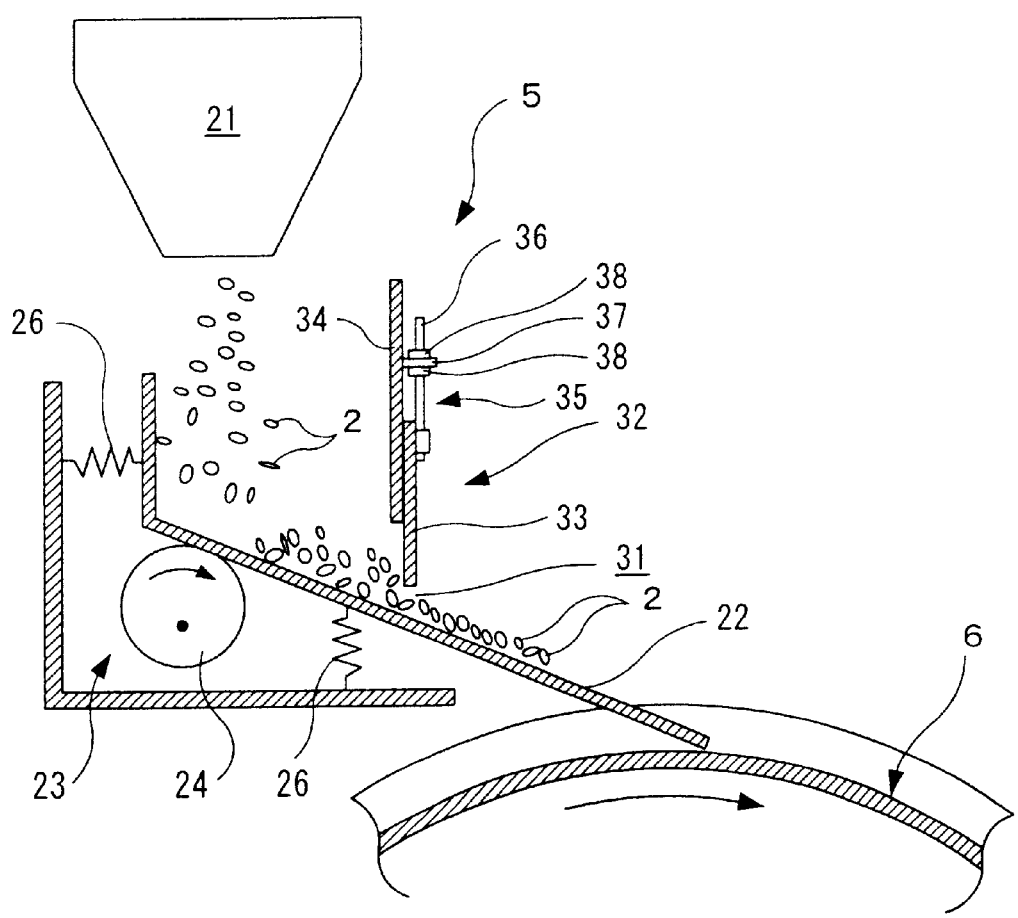
FIG. 2 is an enlarged vertical sectional view showing a specified-amount feeder of the plastic sorter.

The present invention will be described with reference to the accompanying drawings.

FIG. 1 is a view showing an entire configuration of a static separating plastic sorter according to the present invention which separates a plurality of different types of plastic pieces from one another and collects them according to their types. That is, the tribo electrifying apparatus frictionally contacts plastic pieces with one another to electrify them positively or negatively depending on the types of the plastic pieces contacting with one another and according to their electrification ranks. For example, when as the plastic pieces, polypropylene (PP) and polyethylene (PE) pieces are agitated for tribo electrification by the tribo electrifying apparatus, the PP pieces are negatively electrified, while the PE pieces are positively electrified. Then, by dropping and passing the plastic pieces through a sorting static field formed between electrodes to which a high voltage has been applied, static force is effected to vary the falling tracks of the PP and PE pieces, so that the PP and PE pieces can be collected so as to be separated from each other. The PP and PE pieces have already been crushed to a size of, for example, 5 mm or less.

That is, as shown in FIG. 1, the plastic sorter according to the embodiment of the present invention comprises a tribo electrifying apparatus 3 for electrifying plastic pieces 2 by using an agitating blade (not shown) to mix the plastic pieces 2 for frictional contact, a specified-amount feeder 5 arranged below a closable ejection port 4 in the tribo electrifying apparatus 3 to feed a specified amount of plastic pieces 2, a static separating section 1 arranged below the specified-amount feeder 5 to statically separate and sort the plastic pieces fed by the specified-amount feeder 5, according to their polarities and amounts of electrification, and a collecting section 12 for collecting therein the plastic pieces passed through the static separating section 1 and separated from one another.

The static separating section 1 has a grounded metal drum electrode 6 arranged near and below the specified-amount feeder 5 and rotationally driven around a horizontal shaft at a predetermined rotation speed in a direction shown by an arrow in the drawing, an opposite electrode 8 arranged obliquely above the drum electrode 6 via a space used as a sorting static field 7, a high-voltage power source apparatus having a negative pole connected to the opposite electrode 8 and a grounded positive pole, the high-voltage power source apparatus feeding a sorting static field 7 by applying a high voltage between the drum electrode 6 and the opposite electrode 8, and a brush 10 arranged under an outer peripheral surface of the drum electrode 6 to scrape off the plastic pieces 2 attached to the drum electrode 6. Further, the collecting section 12 has a collecting container 11 for collecting the plastic pieces 2 passed through the sorting static field 7 and separated from one another according to their polarities and amounts of electrification.

Further, as shown in FIG. 2, the specified-amount feeder 5 is composed of a specified-amount feeding container 21 for feeding a specified amount of tribo-electrified plastic pieces 2, a feed tray 22 arranged between the specified-amount feeding container 21 and the drum electrode 6 so as to incline downward through a predetermined angle and having a flat plate-like surface that guides the plastic pieces 2 to the drum electrode 6, and a vibrator 23 for vibrating the feed tray 22 in a predetermined direction according to a predetermined cycle.

The vibrator 23 is composed of a cylindrical cam member 24 supported so as to be rotatable at an eccentric location and in contact with a bottom surface of the feed tray 22 (the feed tray may be shaped like a plate), an electric motor (not shown) for rotating the cam member 24, and a plurality of elastic support members 26 for supporting the feed tray 22 on a support frame 25 so that the feed tray 22 can vibrate.

The elastic support members 26 are composed of, for example, a plurality of restraining coil springs, and are connected between the support frame 25 and the bottom surface and end wall portion of the feed tray 22 to bias the feed tray 22 toward the support frame 25 so as to prevent the feed tray 22 from being separated from the cam member 24. Of course, the mounting directions and positions of the plurality of coil springs can be changed as appropriate.

Furthermore, a partitioning member 32 forming a gap 31 over a front surface of the feed tray 22 through which the plastic pieces 2 are passed is arranged over the feed tray 22 in a direction in which the partitioning member traverses the feed tray 22. Thus, the plastic pieces 2, moving over the feed tray 22, pass through the gap 31 and thereby the mass thereof are further disentangled to form a thin uniform layer extending in its width direction. The layer moves to an exit side.

The partition member 32 is composed of a rectangular partitioning plate 33 forming the gap 31, a rectangular support plate 34 for supporting the partitioning plate 33, and a support member 35 for supporting the partitioning plate 33 on the support plate 34 so as to adjust it in its height direction.

Further, the support member 35 is composed of a support rod 36 having a bottom portion connected to the partitioning plate 33 and a threaded portion formed in an upper part thereof, a bracket 37 fixed to the support plate 34 and having a hole (not shown) formed therein and through which the threaded portion of the support rod 36 is inserted, and a pair of nuts 38 to which the support rod 36, which has been inserted through the bracket 37, is adjustably fixed. Then, by rotating the nut 38, the partitioning plate 33 can be moved in its height direction to adjust the gap 31 between the partitioning plate 33 and the feed tray 22. (The feed tray 22 has a large number of variations, which will be described later.)

Figure 3:
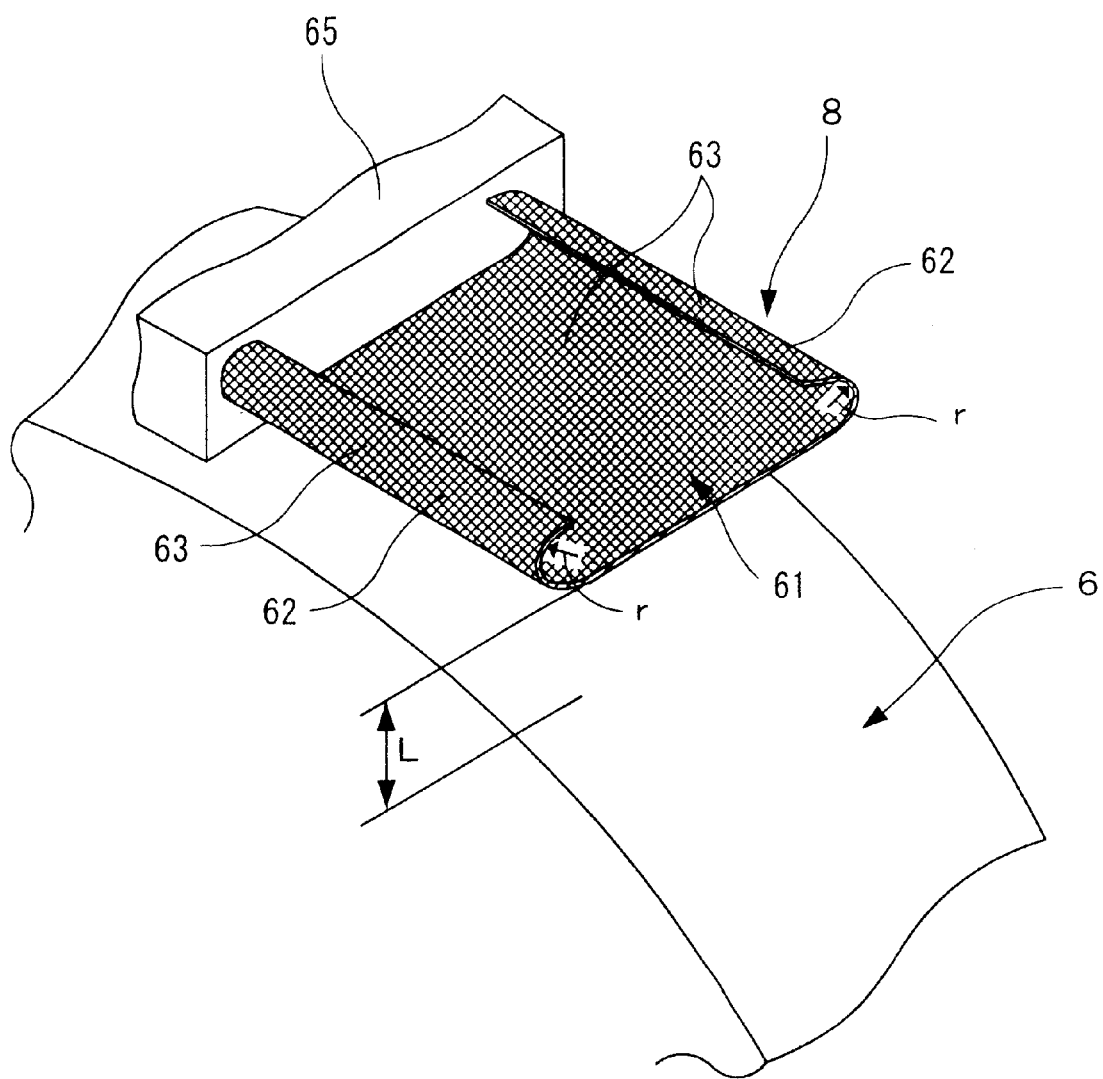
FIG. 3 is a perspective view showing an opposite electrode of the plastic sorter as viewed from above.

As shown in FIGS. 3 and 4, to prevent corona discharge, which is likely to occur when an applied voltage is increased, a curved surface portion 62 is formed along both side edges of a plate portion 61 of the opposite electrode 8 so as to be bent away from the drum electrode 6, and a coated insulated portion 63 coated with a resin material, an insulator, is formed on a rear surface of the plate portion 61 except for an opposite surface 61a thereof which is located opposite the high-voltage electrode 8. Consequently, corona discharge can be prevented even with a sufficiently high applied voltage, thereby allowing the plastic pieces to be sorted more precisely.

The opposite electrode 8 is formed to have a sufficient radius of curvature to make the radius r of the curved surface portions 62 half or more of the distance L between the drum electrode 6 and the high-voltage electrode 8, thereby effectively preventing corona discharge.

Further, an electrode holder 65 for supporting the opposite electrode 8 above has a plurality of ventilation ports (air supply means) 64 formed for injecting air downward along a front surface (facing the drum electrode 6) of the opposite electrode 8. Air injected through the ventilation ports 19 prevents the plastic pieces 2 from attaching to the front surface of the opposite electrode 8. Even with long continued operations, this avoids the degradation of the performance of the opposite electrode 8 resulting from the attachment of the plastic pieces 2, thus preventing a decrease in sorting accuracy.

Incidentally, fed air is injected continuously and also compressed air may be injected intermittently. (The opposite electrode 8 has a large number of variations, which will be described later.)

The collecting section 12 is composed of a collecting container 11 that appears rectangular in a top view, a first separator (partitioning wall) 41 arranged closer to the drum electrode 6 and a second separator (partitioning wall) 42 arranged closer to the opposite electrode 8, both separators being arranged inside the collecting container 11, three collecting chambers formed by partitioning the collecting container 11 using the two separators 41 and 42, that is, a first collecting chamber 43 arranged below the drum electrode 6 to collect positively electrified plastic pieces 2, a second collecting chamber 44 arranged below the opposite electrode 8 to collect negatively electrified plastic pieces 2, and a third collecting chamber 45 arranged between the first and second collecting chambers 43 and 44 to collect a mixture of positively and negatively electrified plastic pieces 2 that have failed to be separated from one another, and a control section 46 for controlling the positions of the first and second separators 41 and 42. Further, conveyors 51, 52, and 53 for conveying collected plastic pieces 2 are arranged below the collecting chambers 43, 44, and 45.

The first and second separators 41 and 42 are each constructed to have both sides guided by moving rails (not shown) arranged in a horizontal direction and to be movable in a horizontal direction so as to approach or leave the drum electrode 6 using a screw mechanism 55 (such as a ball screw) arranged parallel with the moving rails and rotated by a driving apparatus 54 such as a motor.

The control section 46 adjusts the positions of the separators 41 and 42 via the driving apparatus 54 so as to obtain an optimal recovery and purity on the basis of the falling locations of the plastic pieces 2 as calculated from the types of the introduced plastic pieces 2, the mixing ratio, the applied voltage, or the like. In addition to the screw mechanism, the moving means for the separator may include a cylinder apparatus or the like.

Further, the above embodiment includes heating means 71 for heating a sorting atmosphere to reduce humidity. The heating means 71 is composed of a box member 72 enclosing the feed tray 22, the drum electrode 6, the opposite electrode 8, and the first to third collecting chambers 43 to 45, and a heat source 73 for heating the sorting atmosphere in the box member 72 for dehumidification. The heat source 73 is a heating lamp or an infrared heater suspended from an internal upper part of the box member 72.

Figure 5:
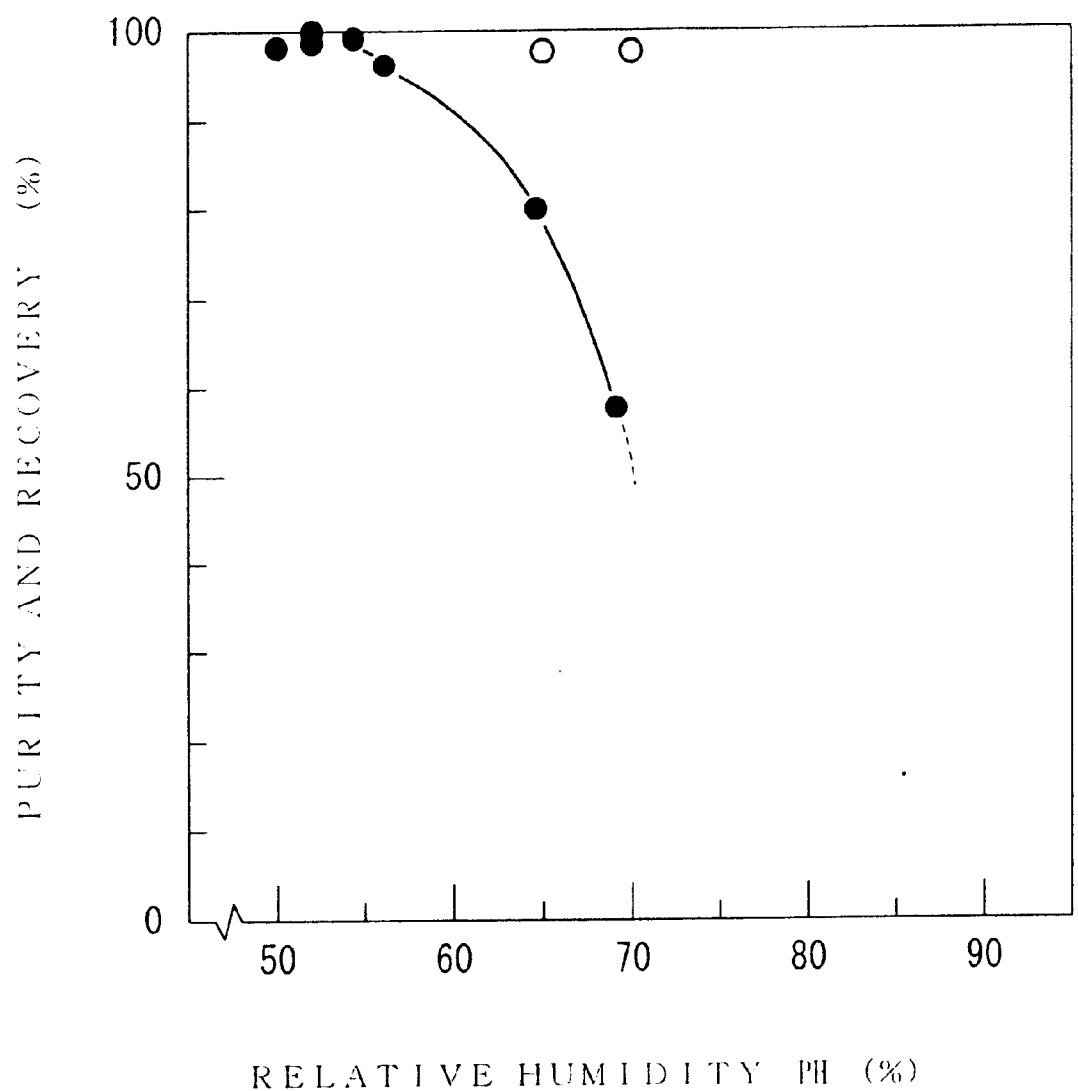
FIG. 5 is a graph showing relative humidity vs. purity and recovery as achieved by heating means.

FIG. 5 is a graph showing the results of experiments in which the sorting atmosphere in the box member 72 was or was not heated for dehumidification. In this graph, the axis of ordinates indicates the relative humidity (%), while the axis of abscissas indicates the purity and recovery (%) of the plastic pieces 2; ● denotes the case where the temperature in the box member 72 was not regulated, whereas ○ denotes the case where the temperature was regulated.

The graph in FIG. 5 indicates that if the heat source 73 is not used or the temperature is not regulated, the purity and recovery decrease with an increase in humidity. The graph, however, indicates that the purity and recovery increase if the heat source 73 is used to increase the temperature to reduce the humidity. Specifically, when experiments were conducted by setting the temperature of the room where the plastic sorter was arranged, at 24° C. and setting the humidity at 70%, a conventional plastic sorter that does not use the heat source 73 achieved a PE recovery purity of 60 to 70%. When the temperature in the box member 72 was increased using the heat source 73, the PE recovery purity increased to 97 to 99%. Thus, even with a high indoor humidity of about 70%, by heating the atmosphere in the box member 72, PE pieces could be collected with the same purity as that achieved when the pieces were separated from one another in an indoor atmosphere having a humidity of 55%. (The heat means 71 has a large number of variations, which will be described later.)

With the above configuration, the introduced plastic pieces 2 are electrified by the tribo electrifying apparatus 3 and then delivered from the ejection port 4 to the specified-amount feeding container 21, from which the plastic pieces 2 are dropped and fed onto the feed tray 22 by a specified amount. At this time, the plastic pieces 2, dropped and fed in the form of a mass, are vibrated and disentangled by the rotating cam member 24 so as to have a uniform thickness. The plastic pieces 2 then pass through the gap 31 between the feed tray 22 and the partitioning member 32 to form a thin uniform layer depending on the height of the gap 31. When the plastic pieces 2 are fed onto the drum electrode 6, they do not form a mass but a thin uniform layer. Accordingly, appropriate image and centrifugal force is reliably applied to the plastic pieces 2 on the drum electrode 6.

Furthermore, when the plastic pieces 2 are conveyed to the sorting static field 7, for example, PE pieces positively electrified by the tribo electrifying apparatus 3 are subjected to static force acting in a direction in which they are attracted to the opposite electrode 8 with the negative pole connected thereto. For example, negatively electrified PP pieces are subjected to static force acting in a direction in which they are attracted to the drum electrode 6. That is, the sum of the vectors of the above-described three forces acting on the negatively electrified PE pieces, that is, the image force, centrifugal force, gravity, and static force, acts outward of the drum electrode 6, so that the PE pieces are attracted toward the opposite electrode 8 and collected in the second collecting chamber 44. On the other hand, the sum of the vectors of forces acting on positively electrified PP pieces acts toward the center of the drum electrode 6, so that the PP pieces are attracted toward the drum electrode 6 and collected in the first collecting chamber 43. PP pieces attracted to the drum electrode 6 are scraped off by the brush 10 and collected in the first collecting chamber 43. PP and PE pieces having a small amount of electrification are collected in the intermediate third collection chamber 45.

The plastic pieces 2 collected in the third collecting chamber 45 are subjected to static elimination and then introduced into the tribo electrifying apparatus 3 again, where tribo electrification of the plastic pieces is executed, followed by the above-described operations. Thus, the plastic pieces 2 can be separated from one another and collected again so as to be sorted very precisely.

As described above, in the above embodiment, the specified-amount feeder 5 vibrates the plastic pieces 2 on the feed tray 22 to disentangle them, while passing them through the gap 31 of a predetermined height to provide them on the front surface of the drum electrode 6 in the form of a thin uniform layer. Accordingly, on the drum electrode 6, appropriate image and centrifugal force is allowed to reliably and stably act on the plastic pieces 2, thereby enabling each of the plastic pieces 2 passed through the sorting static field 7 to be precisely sorted depending on their types so as to achieve a high recovery without any large variation of falling traces of the plastic pieces 2. Further, conditions for the apparatuses such as the separators 41 and 42 which have been set on the basis of these forces or the like need not be readjusted, and the plastic pieces can be separated from one another and collected so as to achieve a high purity and recovery.

Further, since the gap 31 between the partitioning plate 33 and the feed tray 22 can be changed by regulating the support member 35 of the partitioning member 32 to adjust the height of the partitioning plate 33, an appropriate gap 31 can be set depending on the type of the separated plastic pieces 2.

Furthermore, the curved surface portion 62 is formed at both side edges of the opposite electrode 8, and the coated insulated portion 63 is formed on the opposite electrode 8 except for the opposite surface 61a, located opposite the high-voltage electrode 8. Consequently, even if a high voltage is applied to the opposite electrode 8 and the drum electrode 6, corona discharge can be effectively prevented to allow the plastic pieces to be more precisely separated from one another. Moreover, the ventilation port 64, formed in the electrode holder 65 for the opposite electrode 8, can prevent the plastic pieces 2 from being attached to the front surface of the opposite electrode 8. Even with long continued operations, this avoids the degradation of the performance of the opposite electrode 8 resulting from the attachment of the plastic pieces 2, thus preventing a decrease in sorting accuracy.

Then, experiments will be described in which mixed plastic pieces 2 made of PE and ABS were separated using the above-described apparatus and manner, which uses the opposite electrode 8 having the curved surface portions 62 and the coated insulated portion 63. The experiments resulted in very precise sorting wherein the purity was 95% or more (purity the amount of resin of a target type collected in the collecting chamber/the total amount of resin collected in the collecting chamber) and the recovery was 90% or more (recovery=the amount of resin of a target type collected in the collecting chamber/the total amount of resin of the target type introduced). No corona discharge or spark occurred. Similar results were obtained when mixed plastic pieces made of PP and PS, PE and PVC, and others were sorted.

Furthermore, the heating means 71 is provided, which is composed of the box member 72 enclosing the feed tray 22, the drum electrode 6, the opposite electrode 8, and the first to third collecting chambers 43, 44, and 45, and the heat source 73 for heating the sorting atmosphere in the box member 72 for dehumidification. Accordingly, by conducting electricity through the heat source 17 to increase the temperature in the box member 72, the surfaces of the drum electrode 6, opposite electrode 8, and plastic pieces 2 can be dried, while the humidity of the sorting atmosphere in the box member 72 can be reduced. Thus, even if the room in which the plastic sorter is installed is very humid, the plastic pieces 2 can be separated from one another and collected with a high purity and recovery.

Further, since the heat source 17 is provided in the box member 72, it is unnecessary to increase the temperature of the entire room in which the plastic sorter is installed, thereby eliminating the need to provide a large-scale facility to reduce facility costs.

Figure 6:
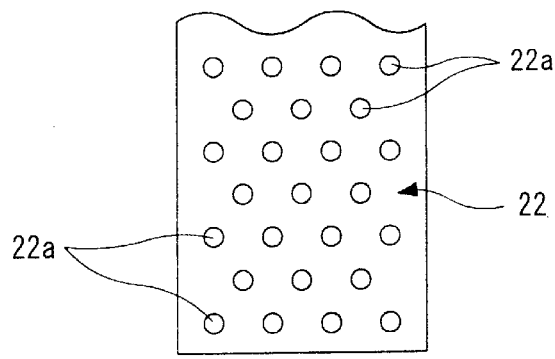
FIG. 6 is a schematic top view showing a variation of a feed tray of the specified-amount feeder of the plastic sorter.
Figure 7:
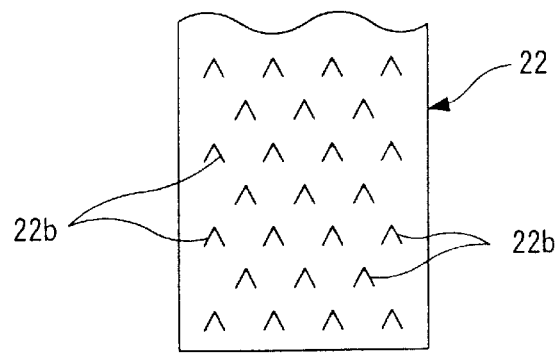
FIG. 7 is a schematic top view showing another variation of the feed tray of the specified-amount feeder of the plastic sorter.
Figure 8:
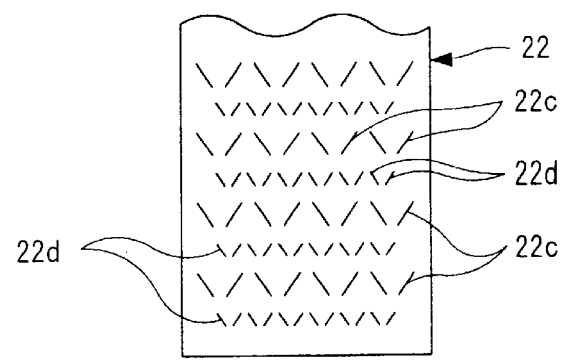
FIG. 8 is a schematic top view showing yet another variation of the feed tray of the specified-amount feeder of the plastic sorter.

Now, FIGS. 6 to 8 show variations of the feed tray 22 of the specified-amount feeder 5 of the above embodiment.

That is, in the above embodiment, the front surface of the feed tray 22 is formed to be flat, but in this variation, the feed tray 22 has a large number of projections on the front surface thereof. That is, FIG. 6 shows that the feed tray 22 has a large number of semi-spherical projections 22a arranged on the front surface thereof in a staggered form or in the form of a lattice. Further, FIG. 4 shows that the feed tray 22 has a large number of inverse-V-shaped projections 22b arranged on the front surface thereof in a staggered form or in the form of a lattice. FIG. 5 shows that the feed tray 22 has two types of rectangular projections 22c and 22d formed on the front surface thereof so that the two types of rectangular projections are alternately arranged in rows, the two types of rectangular projections being different in size and being inclined so as to extend in opposite directions.

By vibrating the feed tray 22 with the projections 22a to 22d formed thereon, the flow of the plastic pieces 2 on the feed tray 22 can be made uniform without any partial bias so that the mass of the plastic pieces 2 is effectively disentangled to form a thin layer. The plastic pieces 2 are further passed between the partitioning member 32 and the tray 22, thereby enabling the plastic pieces 2 to form a thin layer of a predetermined height.

Further, both the feed tray 22 with the projections 22a to 22d and the partitioning member 32 may be used, or only the feed tray 22 with the projections 22a to 22d formed thereon may be vibrated without using the partitioning member 32. In this manner, the construction can be arbitrarily selected according to the nature and type of the plastic pieces 2, and a thin layer can be formed in which the plastic pieces 2 on the drum electrode 6 can be sufficiently precisely separated from one another.

In the embodiment, the separators 41 and 42 of the collecting section 12 can be moved in a horizontal direction by the screw mechanism 20, but the lower ends of the separators 41 and 42 may be supported via support shafts that can be rotated by a servo motor. This servo motor may be used to pivot the separators 41 and 42 around the corresponding support shafts to adjust the width of openings in the collecting chambers 43 to 45.

Figure 9:
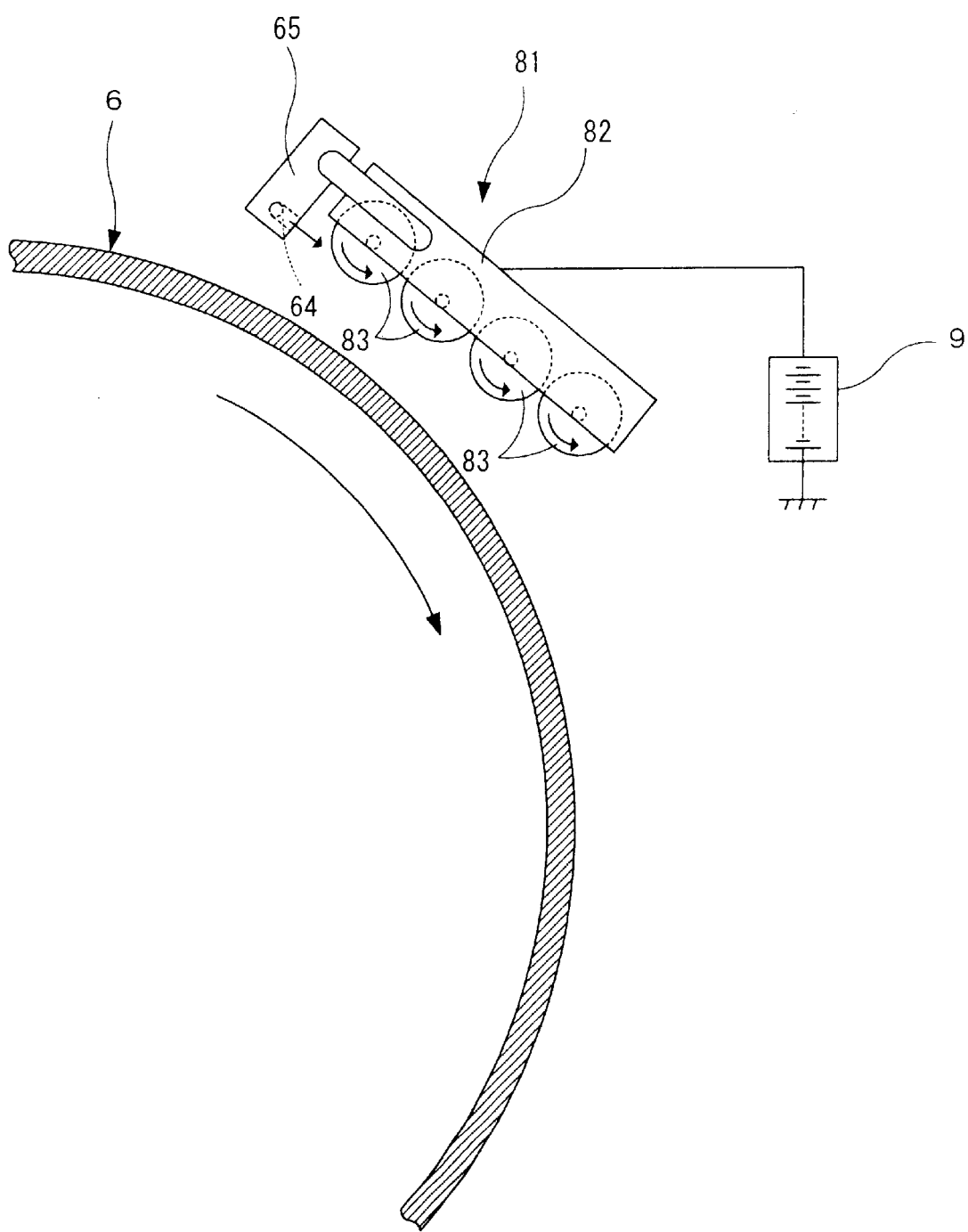
FIG. 9 is a side view showing a variation 1 of the opposite electrode.
Figure 10:
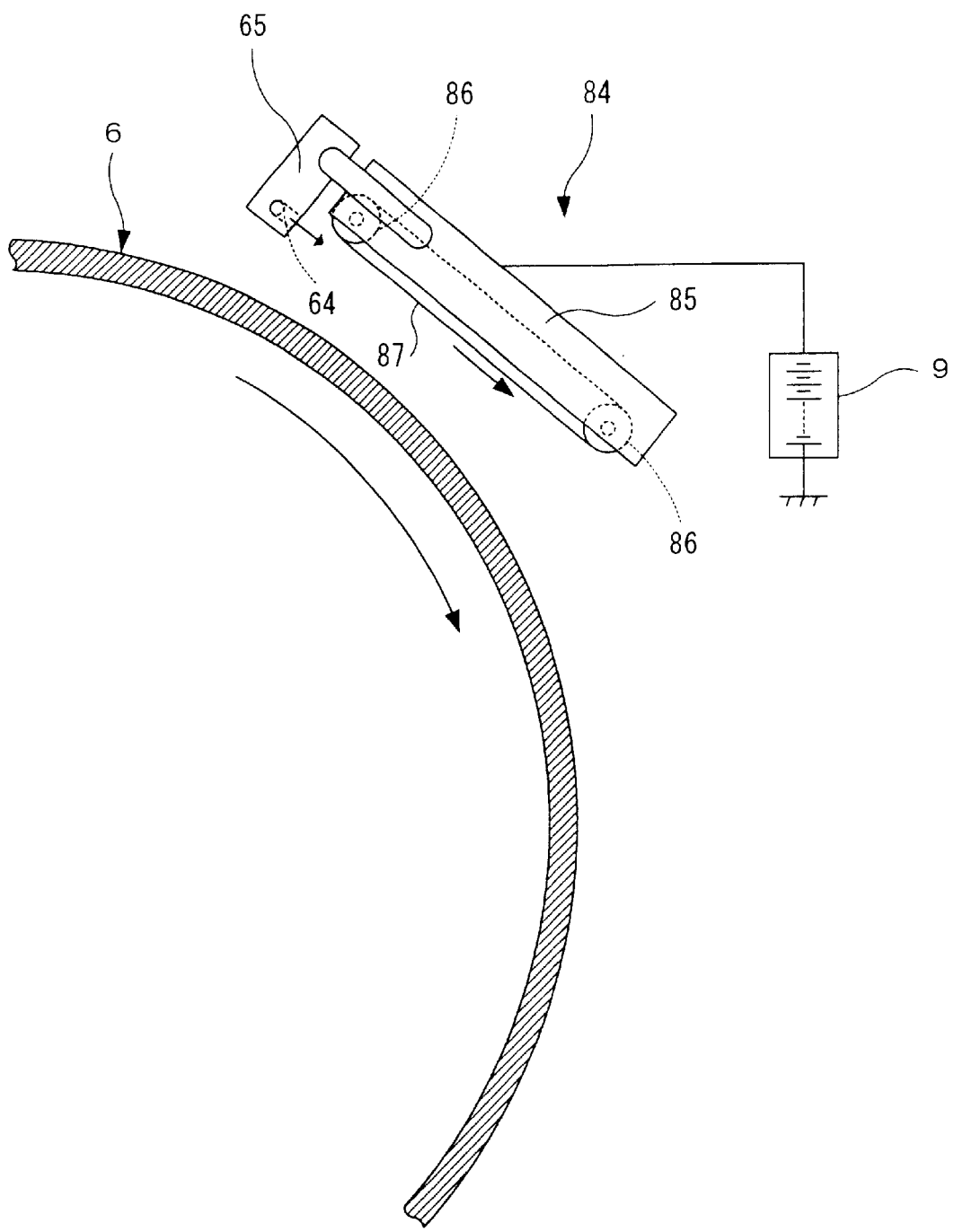
FIG. 10 is a side view showing a variation 2 of the opposite electrode.
Figure 11:
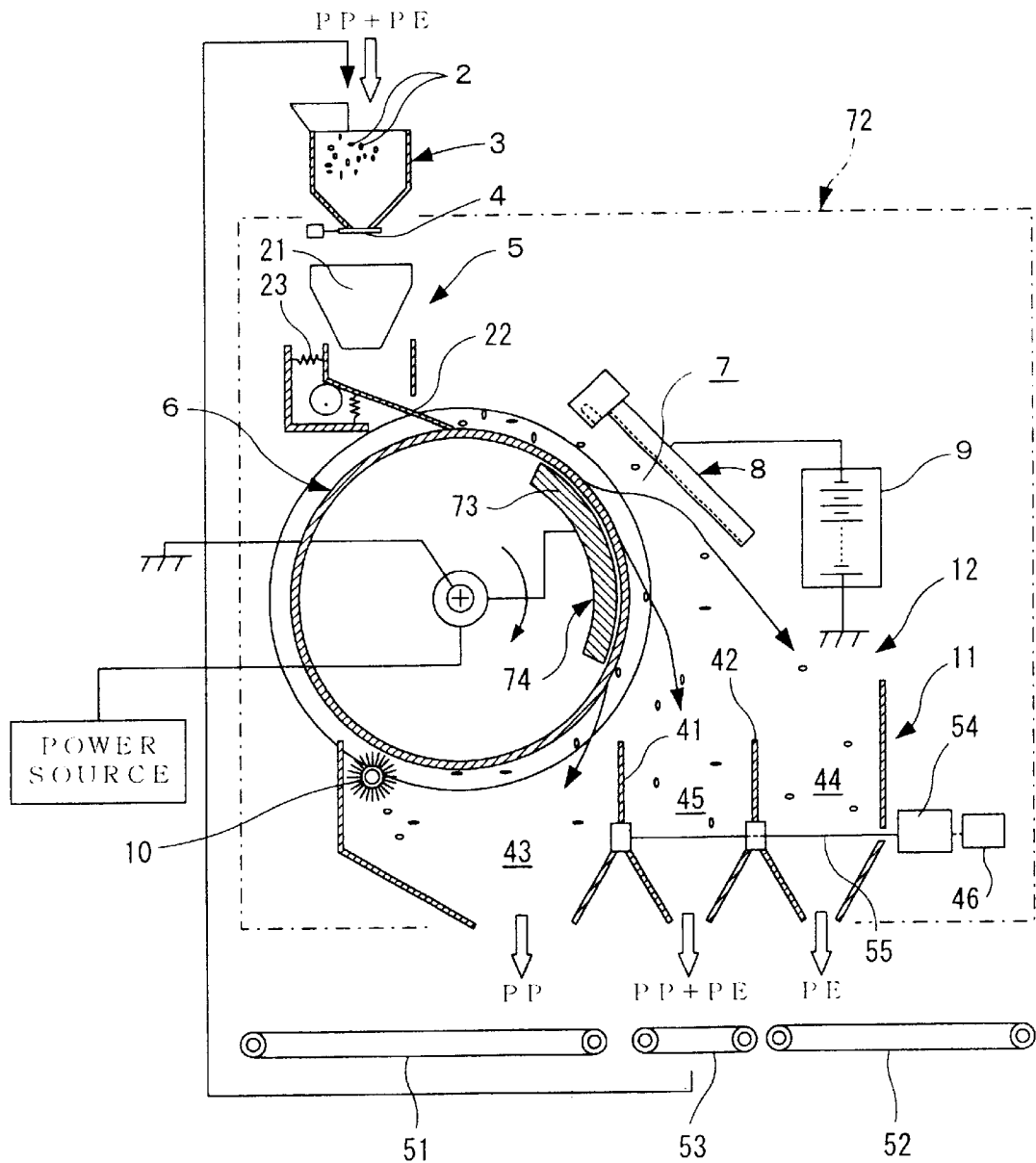
FIG. 11 is a view showing an entire configuration of a variation 1 of the heating means;.

Now, variations of the opposite electrode 8 will be descried with reference to FIGS. 9 and 10.

That is, a variation 1 of the opposite electrode 8, shown in FIG. 9, is a rotary opposite electrode 81. The high-voltage power source apparatus 81 is composed of a casing 82 having an opening located opposite the drum electrode 6, the casing 82 being connected to the high-voltage power source apparatus 9, a plurality of metallic cylinder 83 housed in the casing 82 and supported so as to have a rotating surface lying opposite the drum electrode 6 and to be rotatable around an axis parallel with the rotating axis of the drum electrode 6, and a ventilation port (air supply means) 64 formed in the electrode holder 64 and through which air is injected to blow off the plastic pieces 2 attached to the cylinder 83.

Furthermore, a variation 2 of the opposite electrode 8, shown in FIG. 10, is a high-voltage electrode 84 that can be moved via a metallic endless belt. The high-voltage electrode 84 is composed of a casing 85 having an opening located opposite the drum electrode 6, the casing 85 being connected to the high-voltage power source apparatus 9, endless belts 87 wound around a pair of rollers 86 arranged in the casing 85, and the ventilation port (air supply means) 64 formed in the electrode holder 64 and through which air is injected to blow off the plastic pieces 2 attached to the belts 87.

According to the variations 1 and 2 of the opposite electrode, the rotary high-voltage electrode 81 and the movable high-voltage electrode 84 each have a smaller number of corners at the ends thereof than the conventional plate-like opposite electrode. Consequently, no corona discharge is generated even when a high voltage is applied, thereby enabling the plastic pieces to be precisely sorted.

The radius of the cylinder 83 of the rotary high-voltage electrode 81 and the radius of the rollers 86 of the movable high-voltage electrode 84 are each half or more of the inter-pole distance as in the above-described opposite electrode 8, having the curved surface portions 62, thereby effectively preventing corona discharge. Further, each of the rotating axes of the cylinder 23 and rollers 33 is parallel with the rotating axis of the metallic drum electrode 6, but even if the electrodes are arranged so that the these rotating axes are perpendicular to each other, generation of corona can be prevented to allow the plastic pieces to be sorted precisely.

A variation 1 of the heating means 71 of the above embodiment will be described with reference to FIGS. 11 to 18. The same members as those of the above embodiment are denoted by the same reference numerals, and description thereof will be omitted.

Figure 12:
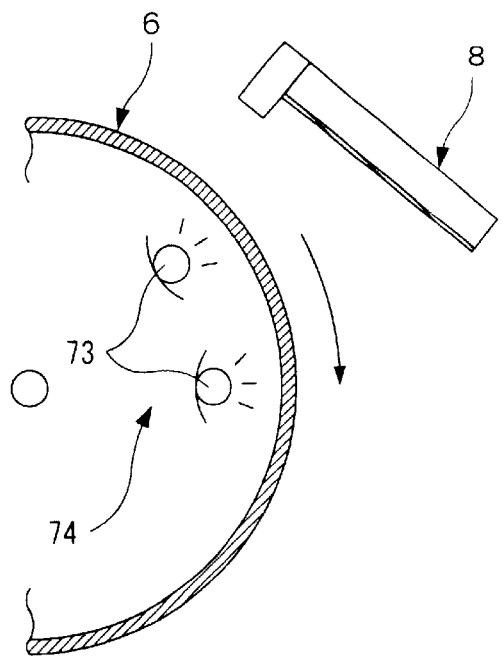
FIG. 12 is a view showing details of part of the configuration of the variation 1 of the heating means.
Figure 13:
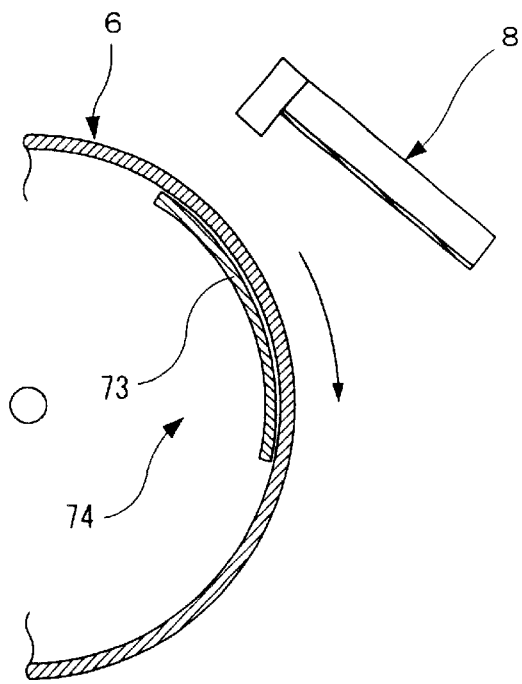
FIG. 13 is a view showing other details of the part of the configuration of the variation 1 of the heating means.

In the above embodiment, the heat source 73 is the heating lamp or infrared heater suspended from the internal upper side of the box member 72, but heating means 74 in the variation 1 is arranged on an inner peripheral surface of the metallic drum electrode 6 and closer to the sorting static field 7. Further, a radiating heat source such as an infrared heater as shown in FIG. 12 or a sheath heater stuck to the inner peripheral surface of the metallic drum electrode 6 as shown in FIG. 13 is used as the heat source 73.

According to the variation 1, even if the room in which the plastic sorter is installed has a humid atmosphere, the humidity in the box member 72 can be reduced by conducting electricity through the radiating heat source 73 to heat the inner surface of the drum electrode 6 or by using the sheath heater to heat and dry the front surface of the drum electrode 6 and further heating the sorting atmosphere in the box member 72 via the metallic drum electrode 6. As a result, the plastic pieces 2 can be separated from one another with a high purity and recovery.

Figure 14:
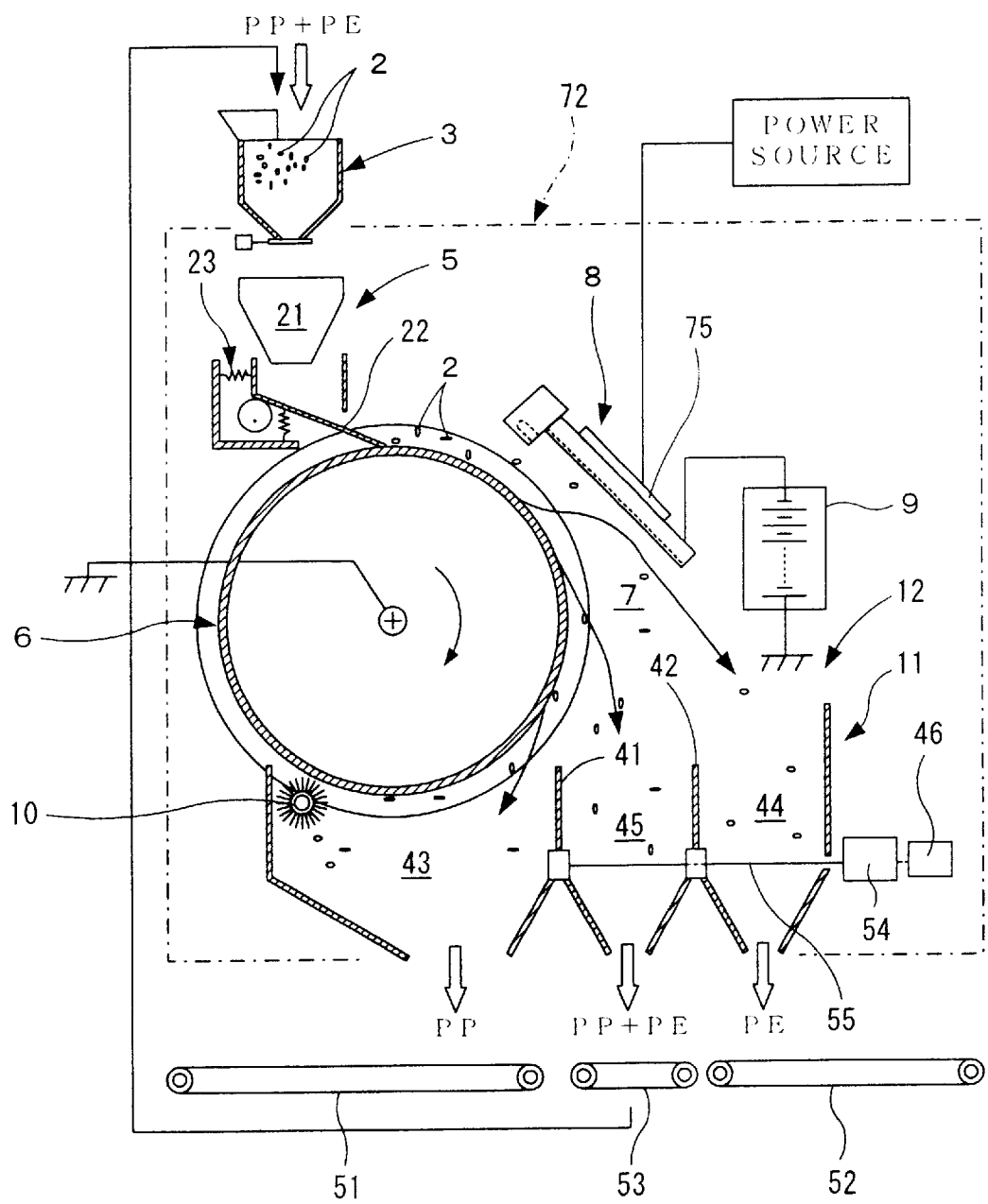
FIG. 14 is a view showing an entire configuration of a variation 2 of the heating means.
Figure 15:
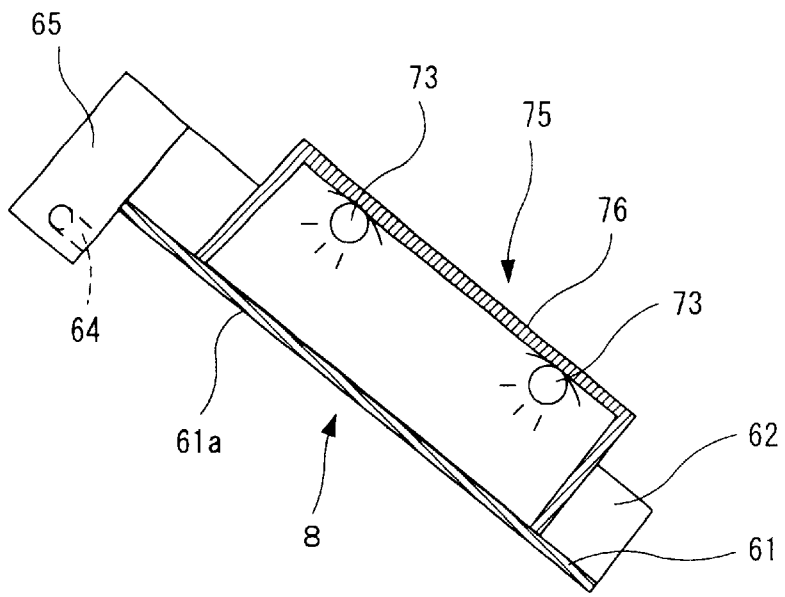
FIG. 15 is a view showing details of part of the configuration of the variation 2 of the heating means.
Figure 16:
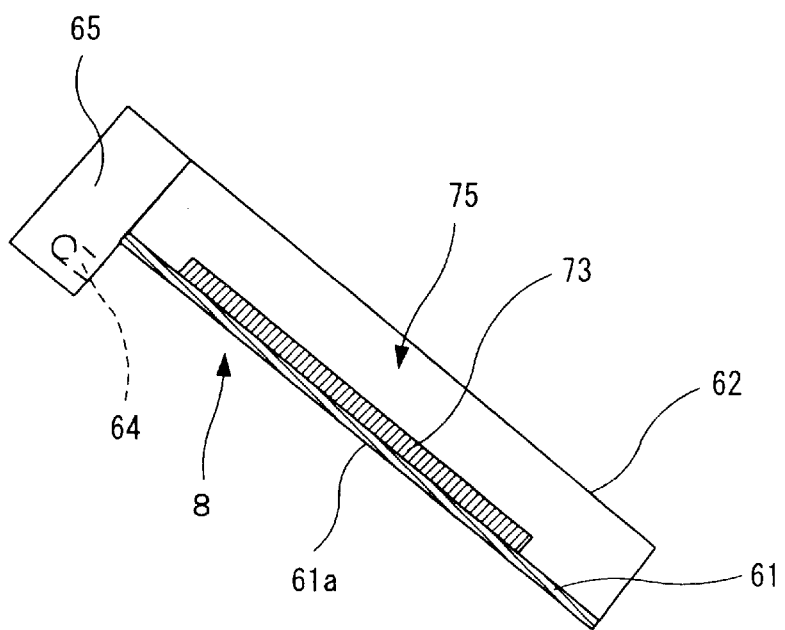
FIG. 16 is a view showing other details of the part of the configuration of the variation 2 of the heating means.

Next, a variation 2 of the heating means 71 of the above embodiment will be described with reference to FIGS. 14 to 16. Heating means 75 according to the variation 2 has a radiating heat source or sheath heater arranged closer to the opposite electrode 8 as the heat source 73, as shown in FIG. 14. More specifically, as shown in FIG. 15, the opposite electrode 8 has a heating box 76 mounted on the rear surface of the plate portion 61 thereof and in which the radiating heat source is installed. Alternatively, as shown in FIG. 16, the high-voltage electrode 6 has the sheath heater stuck to the rear surface thereof as the heat source 73.

According to the heating means 75 of the variation 2, even if the room in which the plastic sorter is installed has a humid atmosphere, the humidity in the box member 72 can be reduced by conducting electricity through the radiating heat source to heat the opposite electrode 8 from its rear surface or using the sheath heater to heat the opposite electrode 8 from its rear surface to heat and dry the front surface of the opposite electrode 8 as well as heating the atmosphere in the box member 15 via the opposite electrode 8 or directly. As a result, the plastic pieces 2 can be separated from one another with a high purity and recovery.

Figure 17:
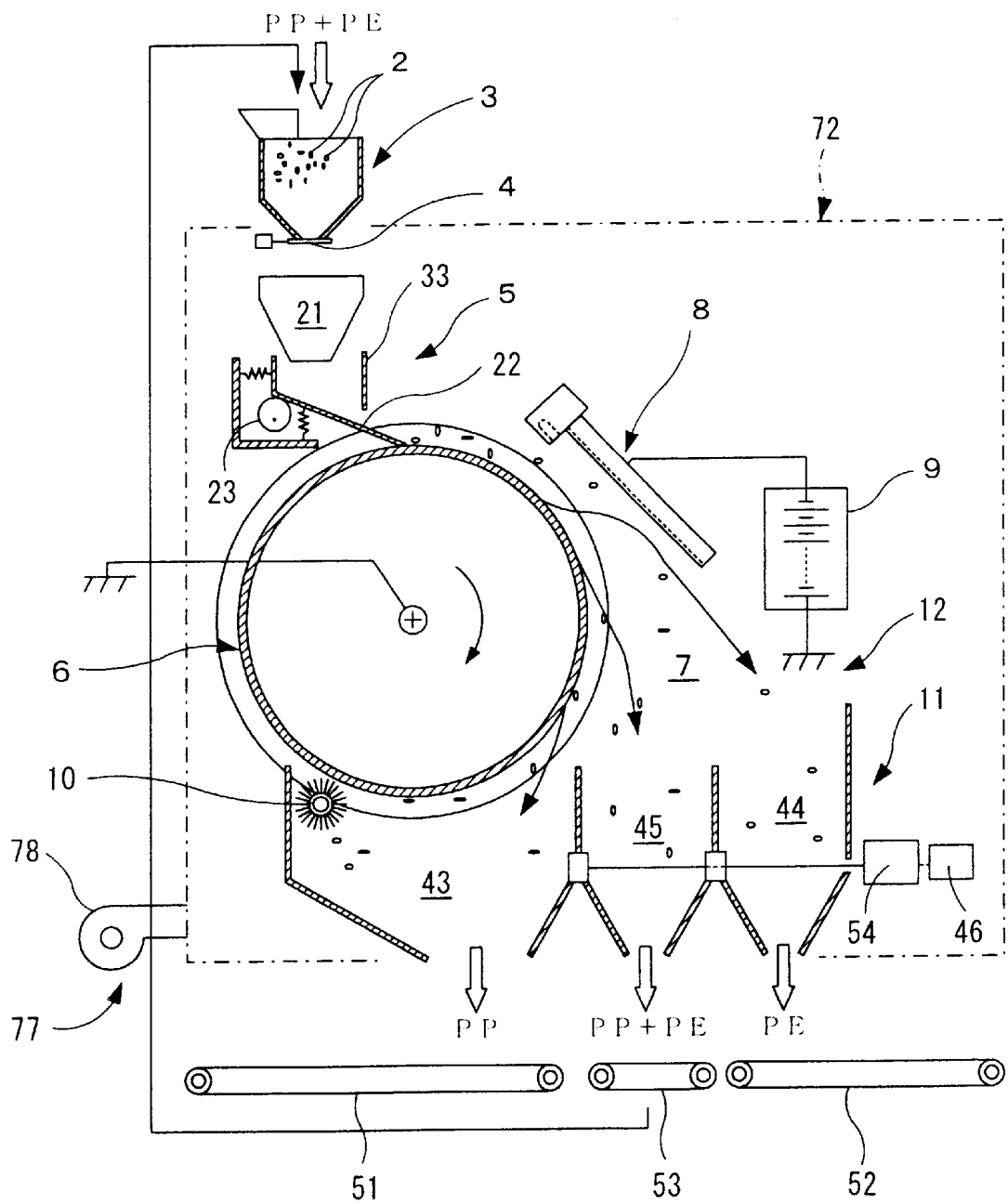
FIG. 17 is a view showing an entire configuration of a variation 3 of the heating means.

Furthermore, a variation 3 of the heating means 71 according to the above embodiment will be described with reference to FIG. 17. The heating means 77 of the variation 3 is provided with a hot air supply fan 78 for supplying hot air to the interior of the box member 72 to heat and dehumidify it.

With the heating means 77, even if the room in which the plastic sorter is installed has a humid atmosphere, the humidity of the box member 72 can be reduced by driving the hot air supply fan 78 to heat the sorting atmosphere in the box member 72 and to dry the surfaces of the plastic pieces 2, drum electrode 6, and opposite electrode. Thus, the plastic pieces 2 can be sorted and separated from one another with a high purity and recovery.

Figure 18:
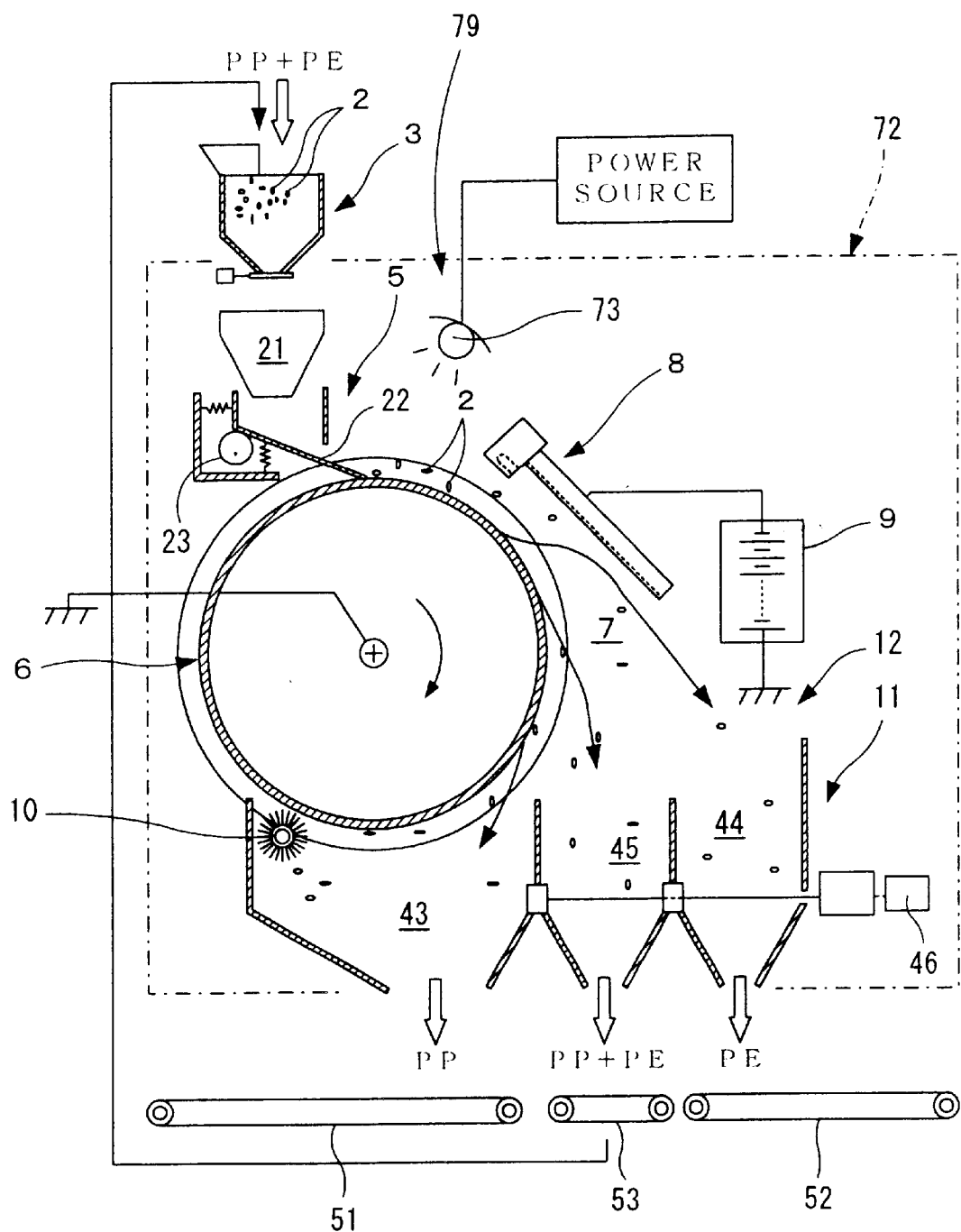
FIG. 18 is a view showing an entire configuration of a variation 4 of the heating means.
Figure 19:
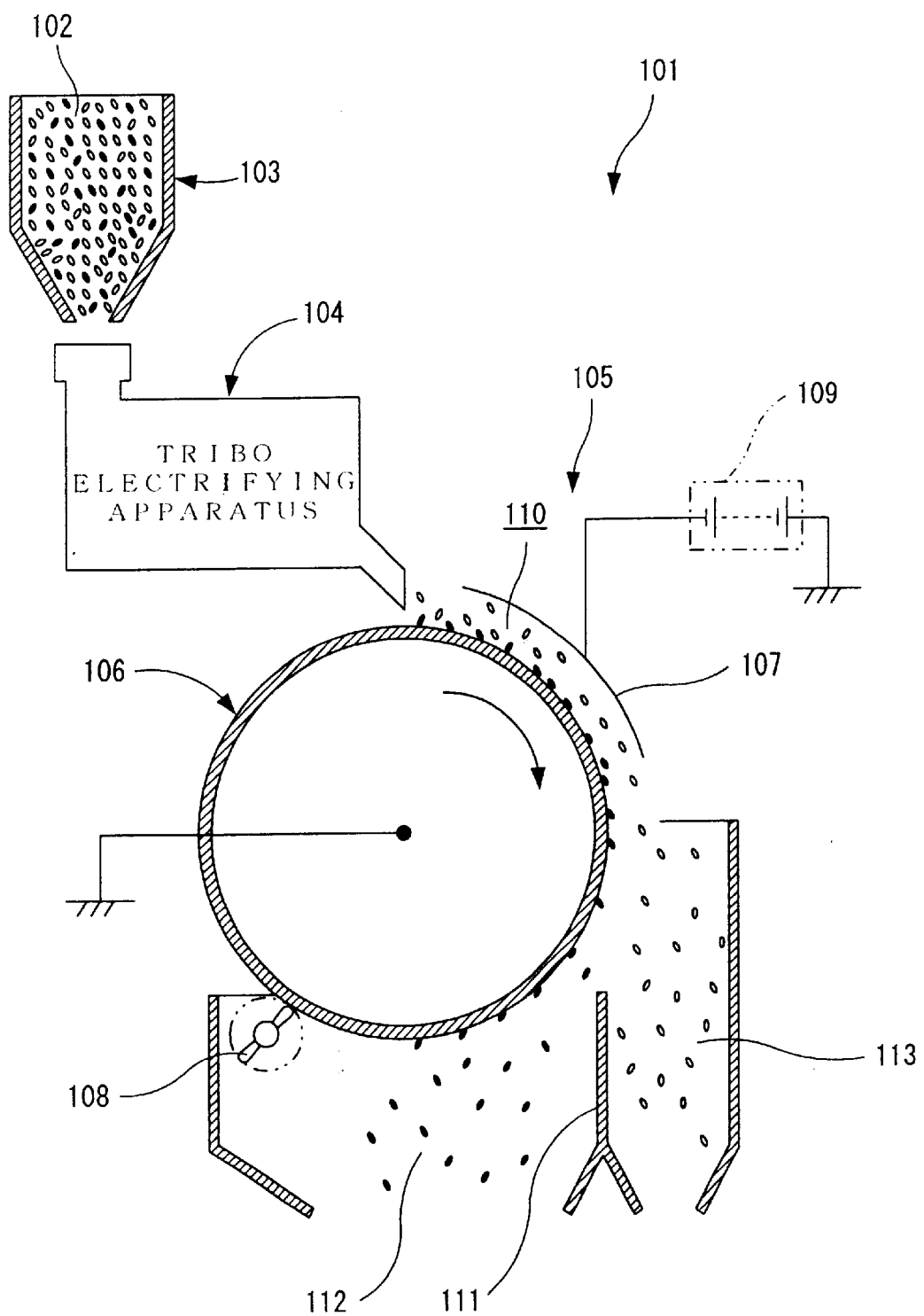
FIG. 19 is a view showing an entire configuration showing a conventional plastic sorter.
Figure 20:
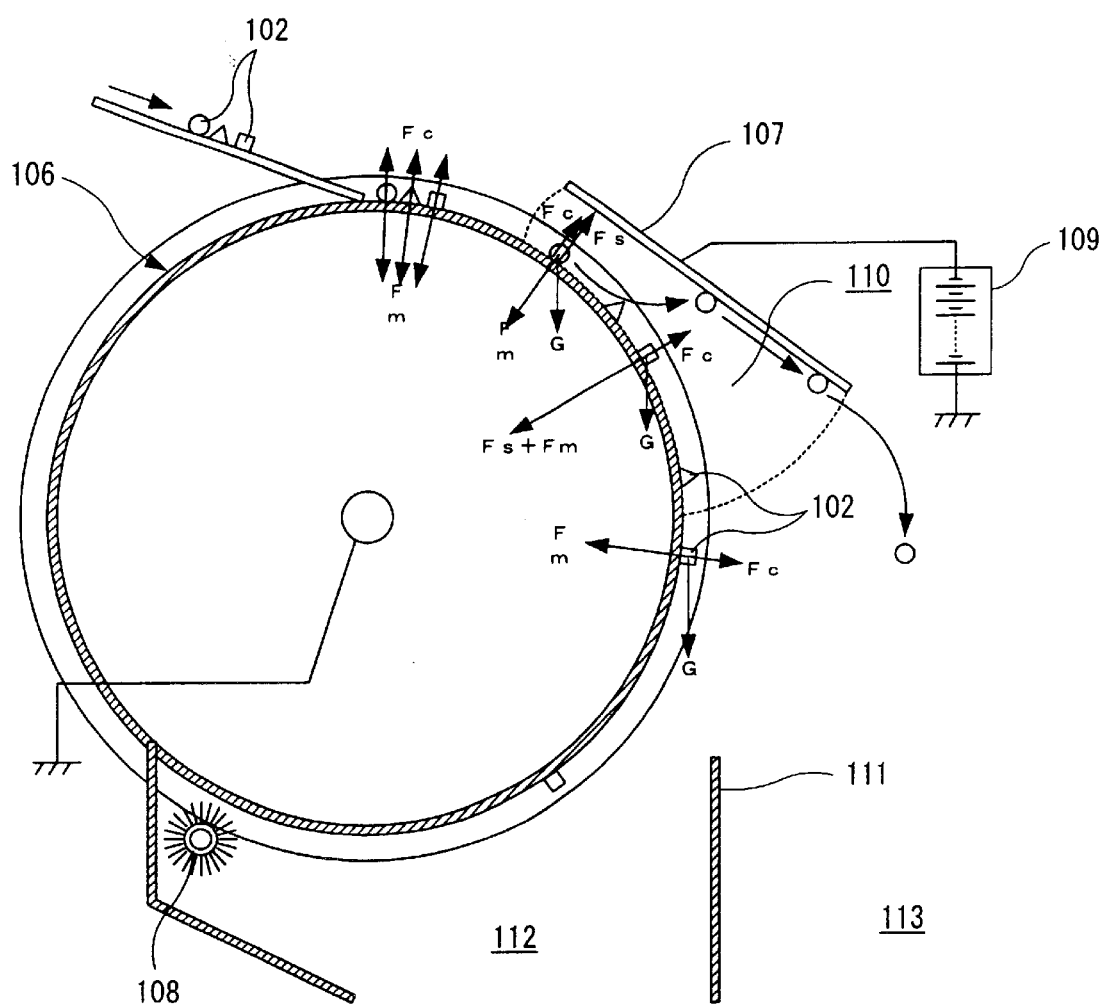
FIG. 20 is a view illustrating operation of the conventional plastic sorter.

Moreover, a variation 4 of the heating means 71 of the above embodiment will be described with reference to FIG. 18. Heating means 79 of the variation 4 has the heat source 73, consisting of a heating lamp or an infrared heater, arranged above an outer peripheral portion of the drum electrode 6 and in a neighborhood of a portion of the drum electrode 6 on which the plastic pieces 2 fall from the feed tray 22.

With the heating means 79, even if the room in which the plastic sorter is installed has a humid atmosphere, when electricity is conducted through the heat source 73, the box member 72 is heated to dry the sorting atmosphere in the box member 72, while heating the plastic pieces 2 fed to the drum electrode 6. Thus, moisture attached to the surfaces of the plastic pieces 2 is evaporated to reduce the temperature in the box member 72, thereby enabling the plastic pieces 2 to be separated from one another with a high purity and recovery.

In the above embodiment, the plastic pieces 2 are primarily PP and PE pieces, but the present invention is not limited to this but is applicable to a mixture of three or more other types of plastic pieces.

Industrial Applicability

As described above, the plastic sorter according to the present invention is suitable for precisely sorting and separating plastic pieces collected and crushed for recycling, from one another depending on their types so as to achieve a high recovery.

What is claimed is:

1. A plastic sorter comprising a tribo electrifying apparatus for tribo-electrifying a plurality of types of plastic pieces by agitation, a feeder for feeding the plastic pieces electrified by the tribo electrifying apparatus, a static separating section for statically separating and sorting the plastic pieces fed by the feeder according to their polarities and amounts of electrification, and a collecting section for collecting therein the plastic pieces passed through the static separating section and separated from one another, said static separating section being provided with a drum electrode that can be freely rotated around a horizontal shaft and an opposite electrode disposed adjacent to the drum electrode to define a space used as a sorting static field, wherein said feeder includes a feed tray for guiding the electrified plastic pieces onto said drum electrode and a vibrator for vibrating the feed tray, and said opposite electrode having a surface portion facing the drum electrode, said sorting static field being defined between the surface portion of the opposite electrode and the drum electrode, and said opposite electrode, except for said surface portion thereof, being covered by an insulating resin material.

2. The plastic sorter according to claim 1, wherein the opposite electrode comprises a plate portion having side edges that are bent away from the drum electrode to define curved surface portions.

3. The plastic sorter according to claim 2, characterized in that a radius of curvature of the curved surface portions is half or more of a distance between the plate portion of the opposite electrode and the drum electrode.

4. A plastic sorter, comprising a tribo electrifying apparatus for tribo-electrifying a plurality of types of plastic pieces by agitation, a feeder for feeding the plastic pieces electrified by the tribo electrifying apparatus, a static separating section for statically separating and sorting the plastic pieces fed by the feeder according to their polarities and amounts of electrification, and a collecting section for collecting therein the plastic pieces passed through the static separating section and separated from one another, said static separating section being provided with a drum electrode that can be freely rotated around a horizontal shaft and an opposite electrode disposed adjacent to the drum electrode to define a space used as a sorting static field, wherein said feeder includes a feed tray for guiding the electrified plastic pieces onto said drum electrode and a vibrator for vibrating the feed tray, the opposite electrode comprises an endless rotary member that is rotationally driven in a direction in which the plastic falls, and the plastic sorter is provided with air supply means for blowing air against said endless rotary member to remove plastic attached thereto.

* * * * *